C. A. F. KRÜGER.
THERAPEUTIC BELT.
APPLICATION FILED OCT. 11, 1912.
1,050,280.
Patented Jan. 14, 1913.
2 SHEETS—SHEET 2.
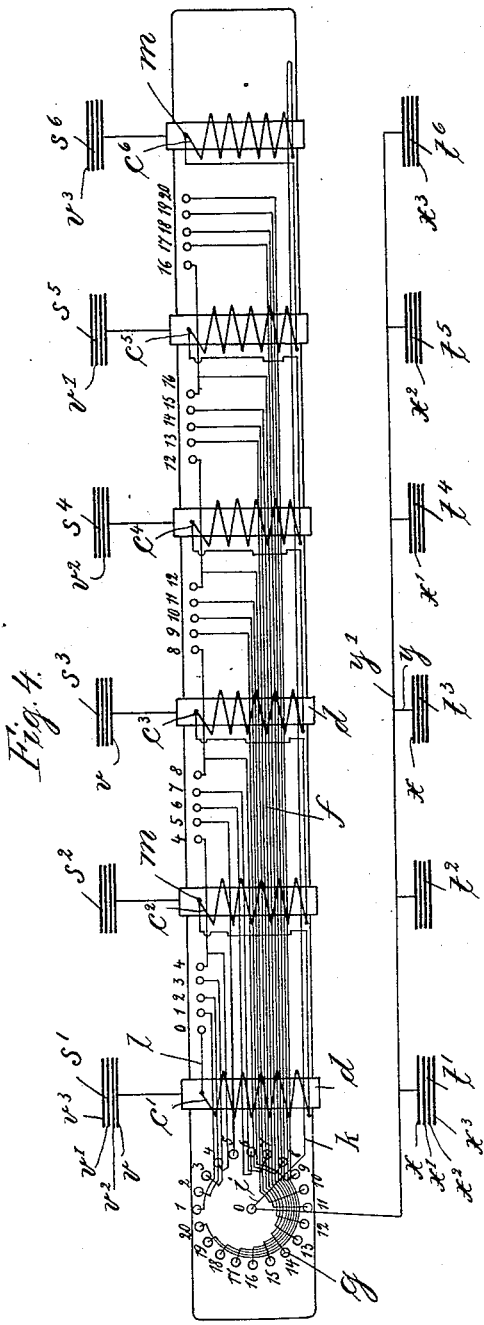
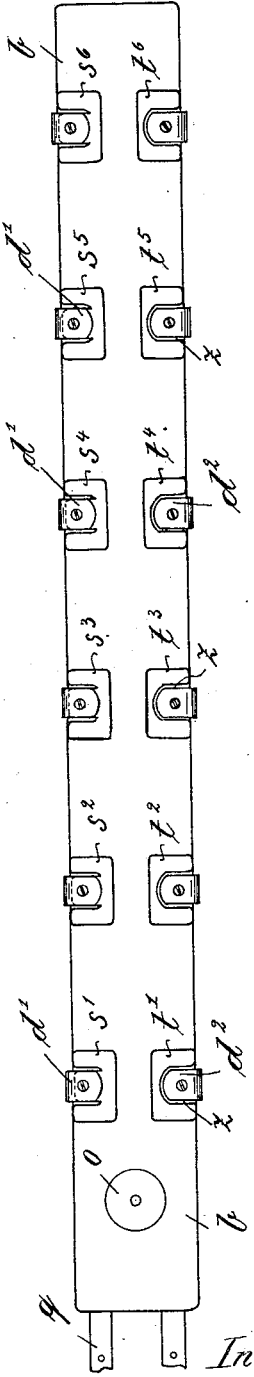
Witnesses:
Charles B Crompton
John A. Perewal.
Inventor:
Carl A. F. Krüger
by E. Braydon Marks
Attorney

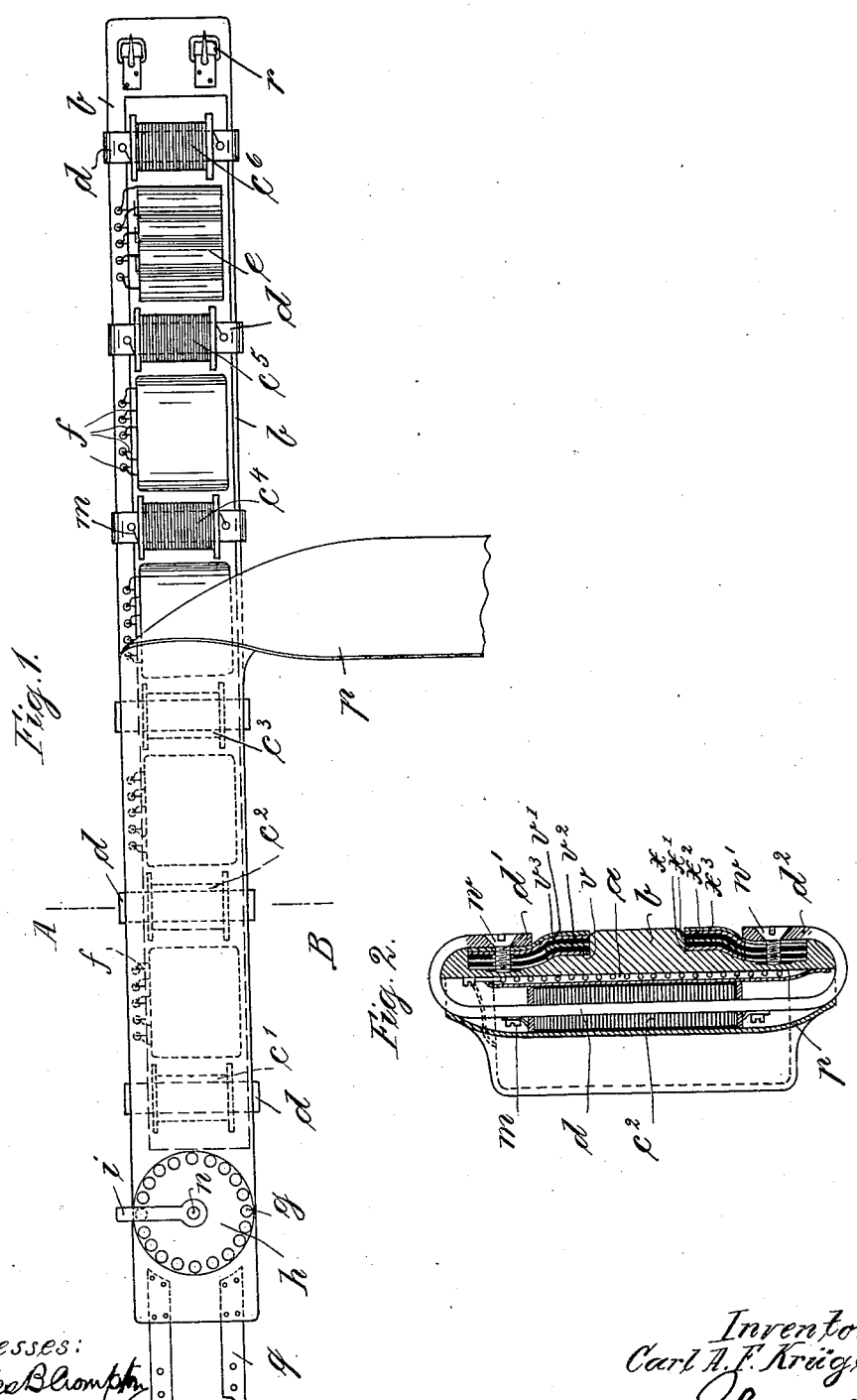

UNITED STATES PATENT OFFICE.

CARL AUGUST FERDINAND KRÜGER, OF GREIFENHAGEN, GERMANY.

THERAPEUTIC BELT.

1,050,280.  Specification of Letters Patent.  Patented Jan. 14, 1913.

Application filed October 11, 1912. Serial No. 725,106.

*To all whom it may concern:*

Be it known that I, CARL AUGUST FERDINAND KRÜGER, subject of the King of Prussia, residing at 545 Stettinerstrasse, Greifenhagen, Province of Pomerania, Germany, have invented certain new and useful Improvements in Therapeutic Belts, of which the following is a specification.

This invention relates to an electro-magnetic belt for therapeutic purposes, by means of which an electric current as well as a number of magnetic lines of force are caused to pass through the body of the wearer.

In order that the invention may be clearly understood, reference is made to the accompanying drawings, which illustrate the preferred construction of my improved therapeutic belt.

Figure 1 is a side view of the belt showing the outer strap partly turned back to show the electro-magnets and batteries. Fig. 2 is a view showing the belt in cross-section on the line A—B of Fig. 1. Fig. 3 is a side-view of the belt in the opposite direction to Fig. 1. Fig. 4 is a diagrammatic illustration of the various electrical connections.

The belt comprises a broad strip $a$ of a suitable strong material having an inner lining of flannel or the like $b$. Secured to the belt at suitable distances apart are a plurality of electro-magnetic coils $c'$ $c^2$, etc., each having a core of soft iron $d$. The upper and lower ends of the cores $c$ are bent inwardly and turned back against the lining $b$ and secured thereto. The inwardly turned ends $d'$ and $d^2$ thus come into direct contact with the body of the wearer when the belt is worn.

Intermediate the electro-magnetic coils $c'$, $c^2$ ... is a plurality of electric batteries $e$, the cells of the batteries being connected in series in the usual manner and by means of leads $f$ to a corresponding number of contacts $g$ mounted upon a switch plate $h$. A pivoted switch $i$ which is adapted to be brought into contact with one or other of the contacts $g$ is connected by means of a lead $k$ to one end of the winding of the electro-magnetic coil $c^6$, the electro-magnetic coils being connected in series and the first of the series $c'$ connected by a wire $l$ to one pole of the battery, this pole being designated by the numeral $o$ in Fig. 4. It will thus be seen that an electric current will pass through the electro-magnetic coils $c'$ $c^2$ $c^3$ and from thence through the switch $i$ back to one or other of the poles of the battery according to the position of the switch $i$ and that the voltage of this current can be regulated according to the position of the switch. The electro-magnetic coils $c'$ $c^2$, etc., are thus excited causing magnetic lines of force to pass from the one end $d'$ to the other end $d^2$ of the cores $d$, these magnetic lines of force passing through the body of the wearer. The cores $d$ are also connected by means of a lead $m$ with one end of their windings $c$, so that the cores $d$ are thus in electrical connection with one pole of the battery. The other pole is, as before stated, connected to the switch $i$ through the contacts $g$, which switch is mounted on pin $n$ passing through the belt and carrying on the inner side of the belt a metal plate $o$ adapted to contact with the body of the wearer. It will thus be seen that, simultaneously with the exciting of the electro-magnets and consequent generation of magnetic lines of force, an electric current will pass from the battery through the cores $d'$ $d^2$ and through the body of the wearer to the plate $o$ and from thence through the switch $i$ to the other pole of the battery; the voltage of this current depending upon the position of the switch $i$.

It will of course be readily understood that, if desired, such of the connections may be dispensed with as to cause only magnetic lines of force or an electric current to pass through the body of the wearer, and that, if desired, the electric battery $e$ instead of being carried by the belt may be independent thereof.

The electro-magnets and batteries may be covered by an outer strip $p$ of any suitable material and the belt may be fastened on the person by means of straps $q$ and buckles $r$ in the ordinary manner.

If desired I may also provide the belt with a plurality of voltaic piles $s'$ $s^2$ ... and $t'$ $t^2$ ... the upper ones $s'$ constituting positive and the lower ones negative piles respectively. The positive piles $s'$ $s^2$ etc. are shown as comprising sheets of copper $v$ and $v'$ and an intermediate sheet of zinc $v^2$ insulated therefrom, the outer sheet of copper $v'$ being protected by an aluminium plate $v^3$ and the whole being electrically connected to the core $d$ by a screw $w$, the aluminium strip $v^3$ and copper strip $v'$ being bent inwardly beneath the inturned end $d'$ of the core $d$. The negative voltaic piles $t'$ $t^2$ etc. comprise an inner sheet of zinc $x$, and superposed sheets of copper and zinc $x$ and $x'$ respectively, suitably insulated from each other, the zinc sheet $x^2$ having a covering of aluminium $x^3$. The metal plates $x$ $x'$ $x^2$ $x^3$ are in this case U-shaped, so as to fit around the inturned end $d^2$ of the core $d$ and are secured thereto but insulated therefrom by a screw $w'$. The aluminium plate $v^3$ and $x^3$ serve merely the purpose of preventing chemical reaction between the voltaic pile and the body of the wearer.

It will be understood from the foregoing description, that the positive voltaic piles $s'$, $s^2$ ... are in connection through the cores $d$ with one pole of the battery, while the negative voltaic piles $t'$, $t^2$ ... are insulated therefrom. The latter are however connected by means of leads $y$, $y'$ in series with each other and with the switch $i$. The plates $x$, $x'$ $x^2$ $x^3$ may be insulated from the turned-in end $d^2$ of the core $d$ by a piece of leather or other insulating material $z$ bent around the end $d^2$. The negative voltaic piles $d'$, $d^2$ are thus in connection with the other pole of the battery through the switch $i$ and cores $d$.

I claim:—

1. A therapeutic appliance comprising a belt, a plurality of electromagnets secured thereon at suitable distances apart, the cores of said electromagnets being bent over said belt, to the inner side thereof, and an electrical source connected to said electromagnets so as to cause magnetic lines of force to pass from one to the other end of each of said cores.

2. A therapeutic appliance comprising a belt, a plurality of electromagnets secured thereon at suitable distances apart, an electrical source connected to said electromagnets, so as to cause megnetic lines of force to pass from one to the other end of each of the cores of said magnets, a connection between one pole of said electrical source and said cores, and a plate on the inner side of said belt connected to the other pole of said electrical source.

3. A therapeutic appliance, comprising a belt, an electrical battery carried by said belt, a plurality of electromagnets carried on the outer side of said belt and at suitable distances apart, the cores of said electromagnets being bent over said belt to the inner side thereof, electrical connections for connecting said electromagnets in series and in circuit with said battery and a contact switch in said circuit.

4. A therapeutic appliance comprising a belt, an electrical battery carried by said belt, a plurality of electromagnets carried on the outer side of said belt and at suitable distances apart, electrical connections for connecting said electromagnets in series and in circuit with said battery, a contact switch in said circuit, a connection from one end of the winding of each electromagnet to its corresponding core, so as to put said cores in electrical connection with one pole of said battery, and a plate on the inside of said belt in electrical connection with the other pole of said battery.

5. A therapeutic appliance comprising a belt, a plurality of electromagnets secured thereon, at suitable distances apart, and electrical source connected to said electromagnets so as to cause magnetic lines of force to pass from one to the other end of each of the cores of said magnets, a plurality of voltaic piles connected with one pole of said electrical source and a plurality of voltaic piles connected with the other pole of said electrical source.

6. A therapeutic appliance comprising a belt, a plurality of electromagnets secured thereon at suitable distances apart, an electrical source connected to said electromagnets so as to cause magnetic lines of force to pass from one to the other end of each of the cores of said magnets, a connection between said electrical source and said cores, a plate on the inner side of said belt, connected to said electrical source, a plurality of voltaic piles connected with one pole of said electrical source and a plurality of voltaic piles connected with the other pole of said electrical source.

7. A therapeutic appliance comprising a belt, a plurality of electromagnets carried on the outer side of said belt at suitable distances apart, the cores of said magnets being bent over said belt to the inner side thereof, an electric battery carried by said belt, a switch, electrical connections for connecting said magnets in series and with one pole of said battery and with said switch, a plurality of switch contacts in electrical connection with the other poles of said battery, a connection from one end of the winding of each magnet to its core, a voltaic pile surrounding one end of each of said cores, and electrically connected thereto, a voltaic pile surrounding the other end of each of said cores but insulated therefrom and electrically connected to said switch, and an electrode on the inside of said belt in electrical connection with said switch.

In testimony whereof I have affixed my signature in presence of two witnesses.

CARL AUGUST FERDINAND KRÜGER.

Witnesses:
HENRY HASPER,
WOLDEMAR HAUPT.

---

Copies of this patent may be obtained for five cents each, by addressing the "Commissioner of Patents, Washington, D. C."